April 28, 1942.    H. E. SOMES    2,281,331
INDUCTION HEAT TREATING APPARATUS
Filed Sept. 17, 1937    9 Sheets-Sheet 4

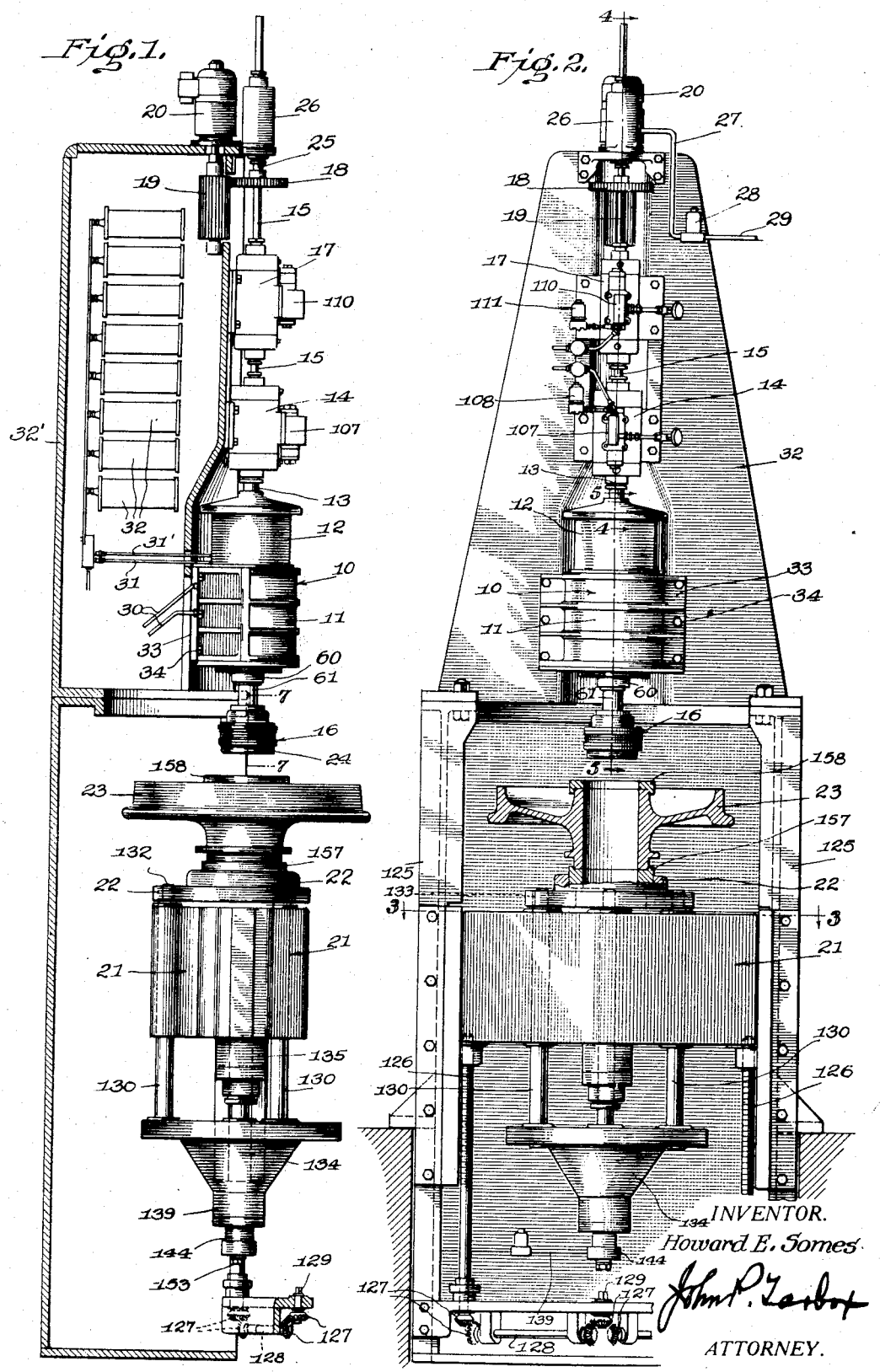

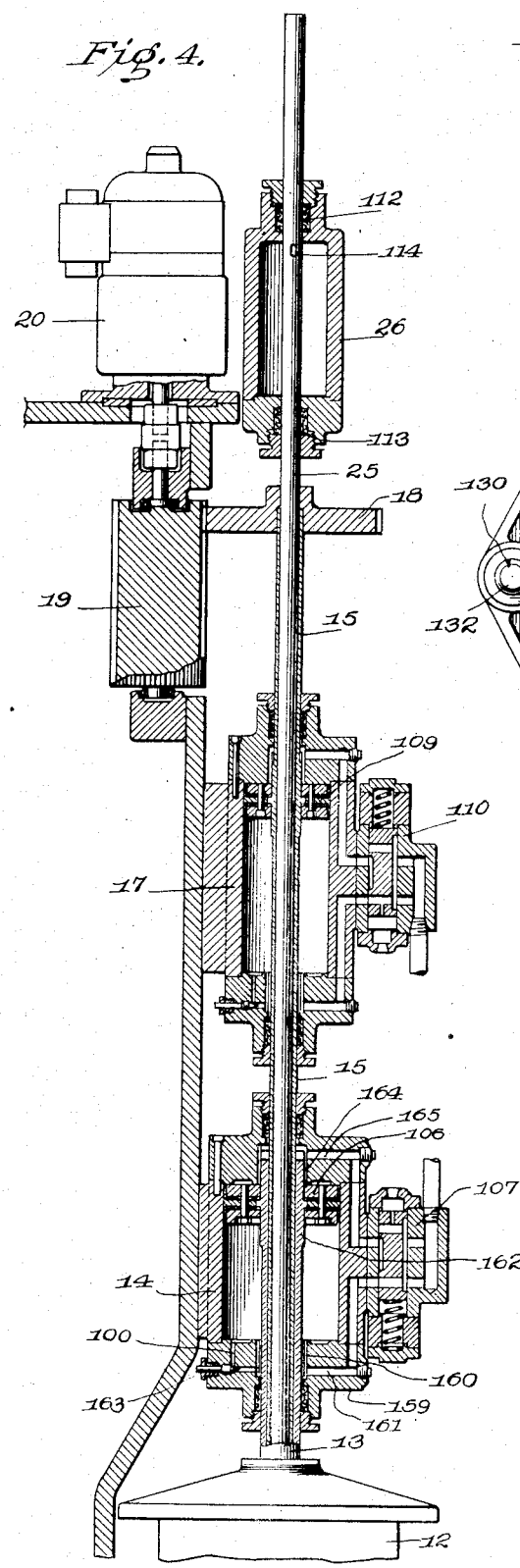
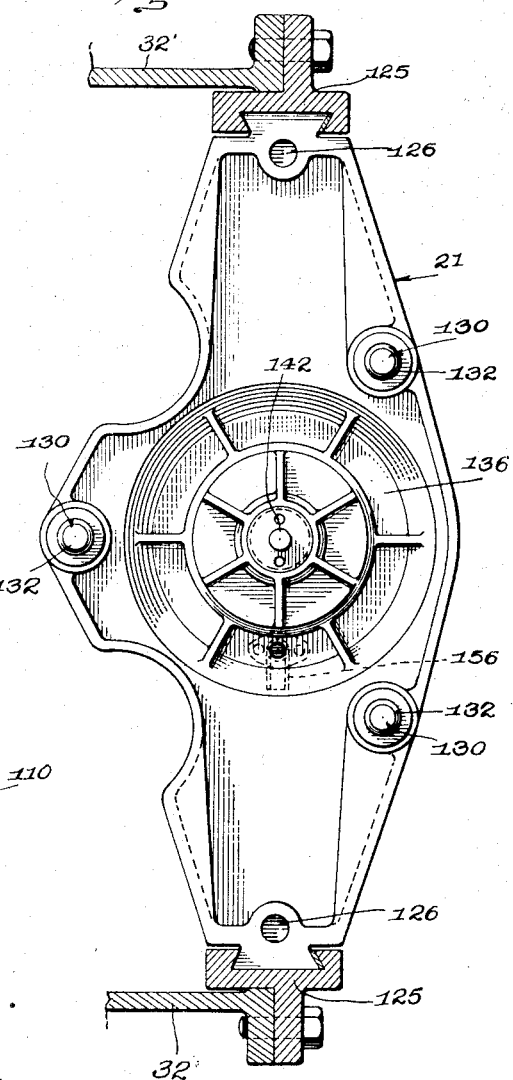

INVENTOR.
Howard E. Somes
BY
ATTORNEY.

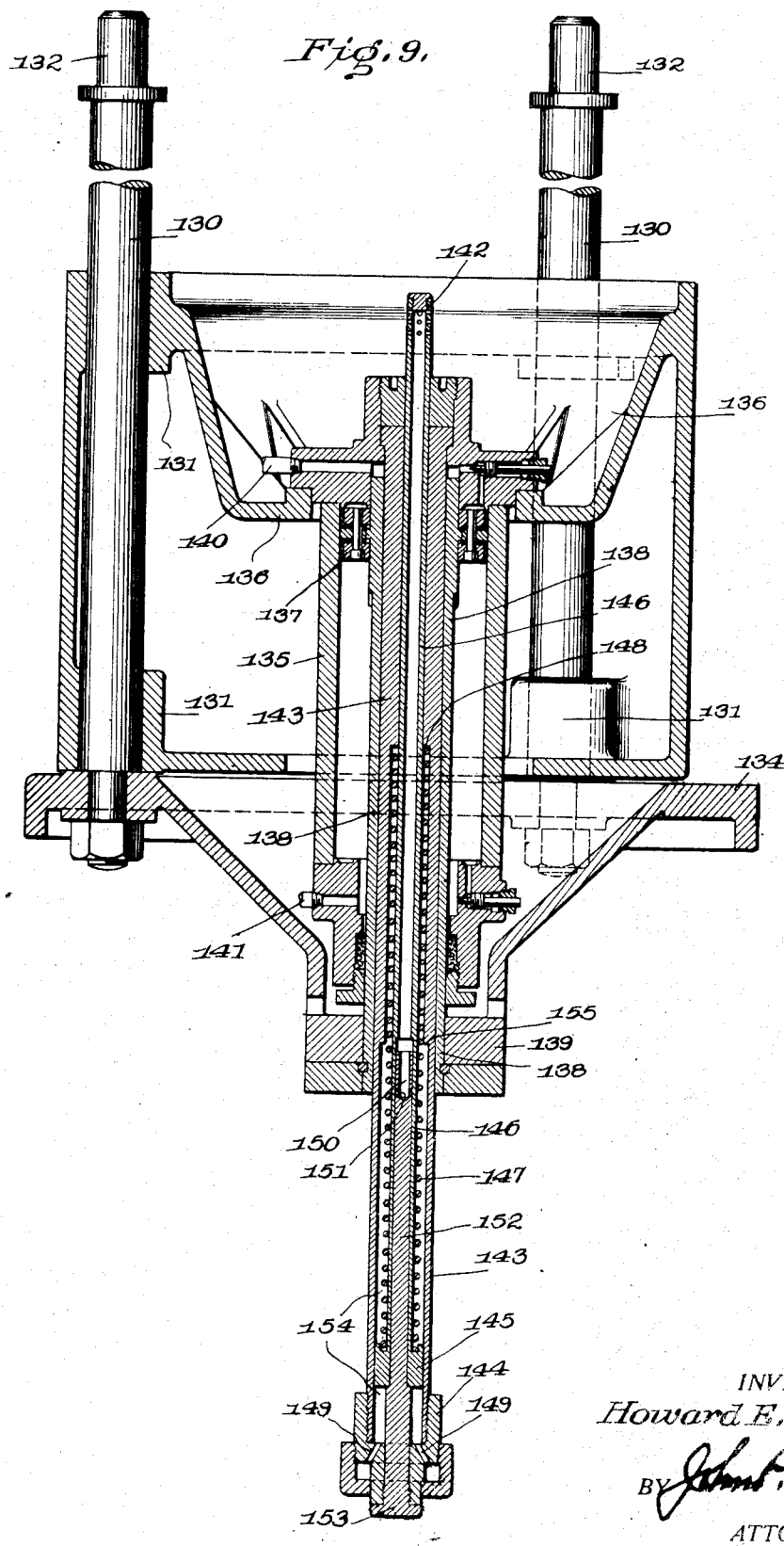

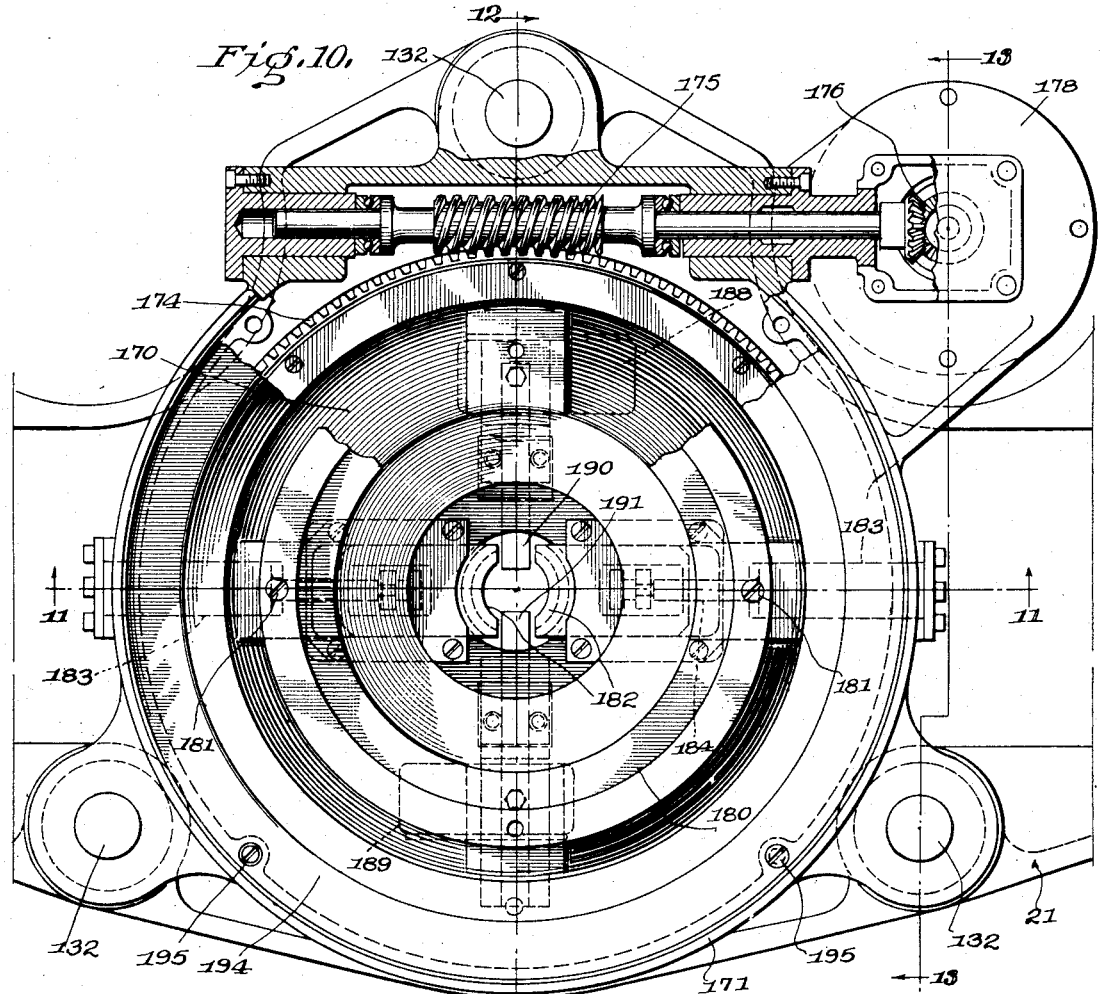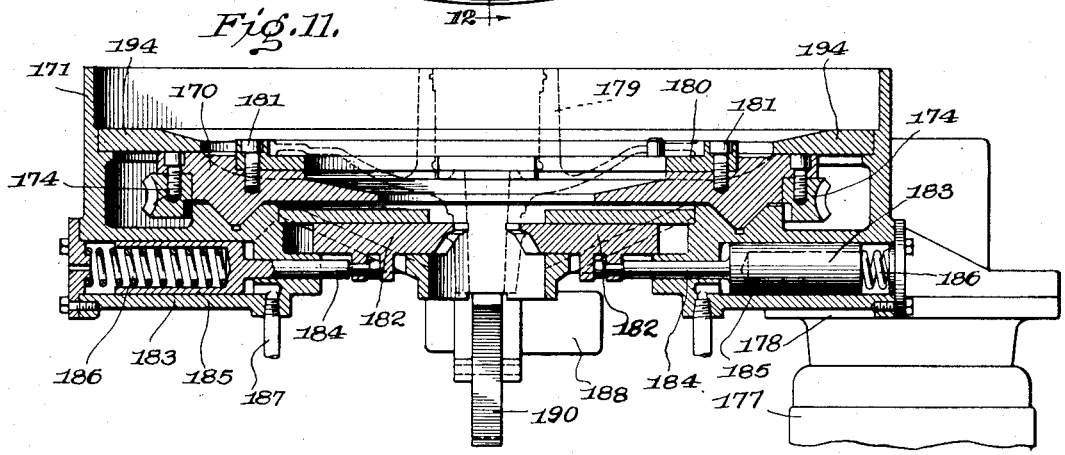

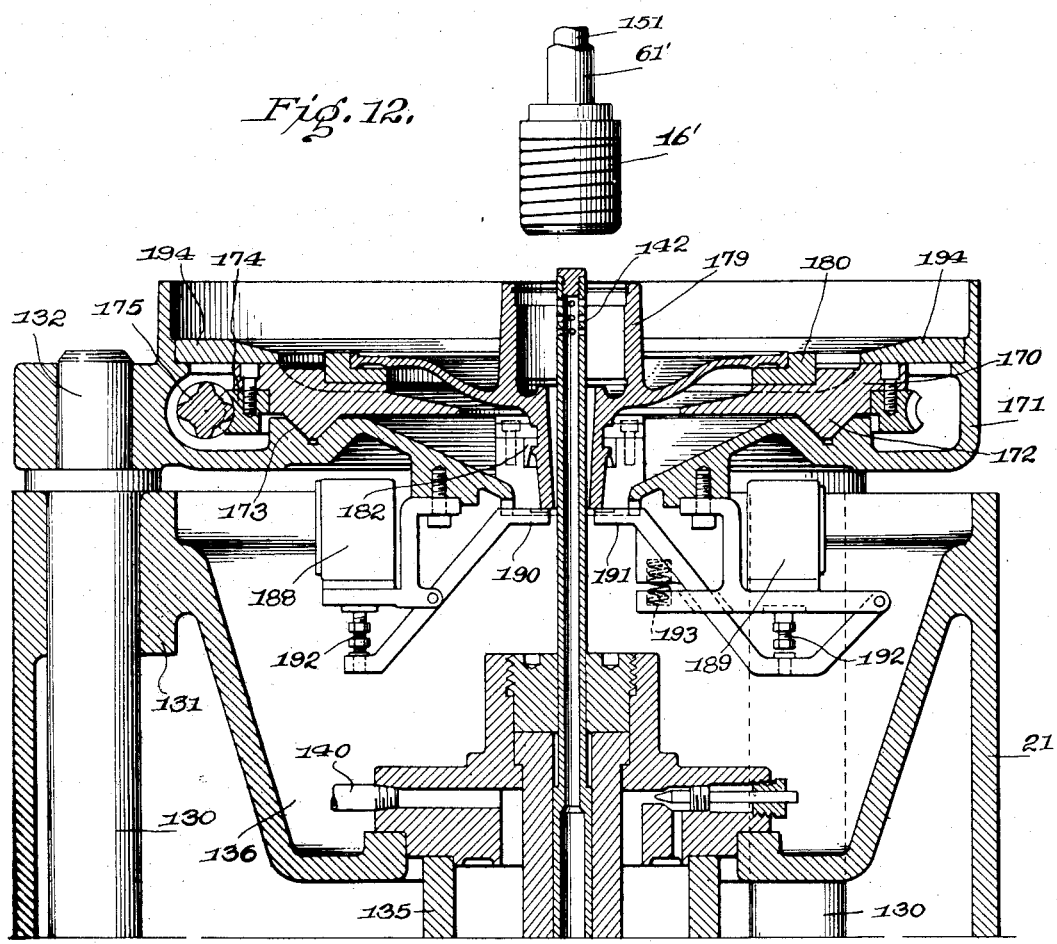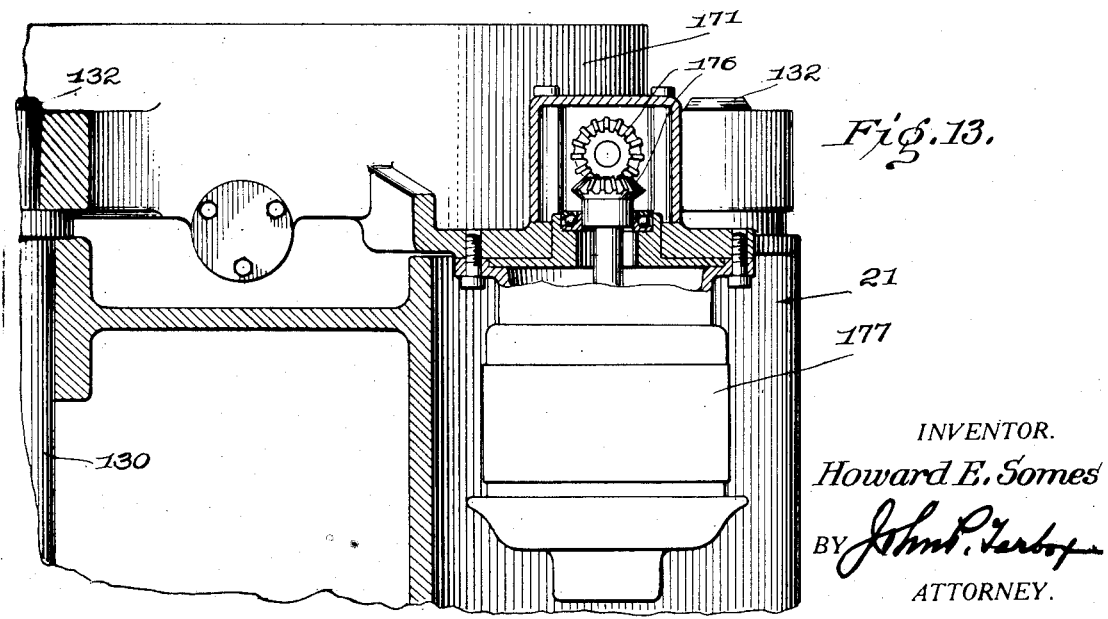

Patented Apr. 28, 1942

2,281,331

UNITED STATES PATENT OFFICE 2,281,331

INDUCTION HEAT TREATING APPARATUS

Howard E. Somes, Detroit, Mich., assignor to Budd Induction Heating, Inc., Philadelphia, Pa., a corporation of Michigan Application September 17, 1937, Serial No. 164,320

29 Claims. (Cl. 266—4)

The present invention relates in general to apparatus for the heat treatment of objects by electro-magnetic induction and in particular to apparatus and method for the heat treatment of annular-form objects by high frequency electro-magnetic induction.

The invention in great part relates to improvements in the art to which pertain my co-pending applications Serial No. 96,346, filed August 17, 1936; and Serial Number 121,598, filed January 21, 1937, now Patent No. 2,208,607 issued July 23, 1940.

An important object of the invention is the provision of an apparatus adapted for effecting the heat treatment of objects of various forms and sizes, and in various ways with substantially no variation in the apparatus structure other than the tool or heating element, for adaptation to such different forms or for the application of different kinds of treatment.

Another object of the invention is the provision of apparatus of universal application as mentioned, but compact in form and readily adjustable or alterable, both mechanically and electrically to its different uses for maximum efficiency for each such use.

Another object is the provision of apparatus enabling the attainment of extreme uniformity in the application of heating energy particularly as to rate of input and the total amount of energy applied throughout an annular zone, heretofor unattainable in low turn stationary inducing coils because coils having each turn a complete unit turn of 360° could not be built due to the necessity for current leads and their insulation, and because the presence of the necessary leads, in the case of an internal coil seriously interfere with the uniform distribution of magnetic flux.

Another object ancillary to the above is the provision of means enabling relative rotary movement between the inducing coil and the work piece without complication of the means for continuously supplying energy and cooling fluid to the coil and with substantially no variation in the electrical constants of the work circuit.

Various other objects and advantages of the invention will appear from a perusal of the following specification and the drawings accompanying the same.

In the drawings:

Fig. 1 is a side elevation of my improved apparatus.

Fig. 2 is a front elevation of the same looking from the right of Fig. 1.

Fig. 3 is a horizontal cross section on the line 3—3 of Fig. 2 and on an enlarge scale.

Fig. 4 is a slightly enlarged sectional view on the line 4—4 of Fig. 2.

Fig. 9 is a side view in axial section of the work platform and work holder looking from the left of Fig. 2.

Fig. 10 is a top plan view partly in section of the rotary work holder.

Fig. 11 is a section on the line 11—11 of Fig. 10.

Fig. 12 is a section on the line 12—12 of Fig. 10.

Fig. 13 is a section on the line 13—13 of Fig. 10.

Figure 5:
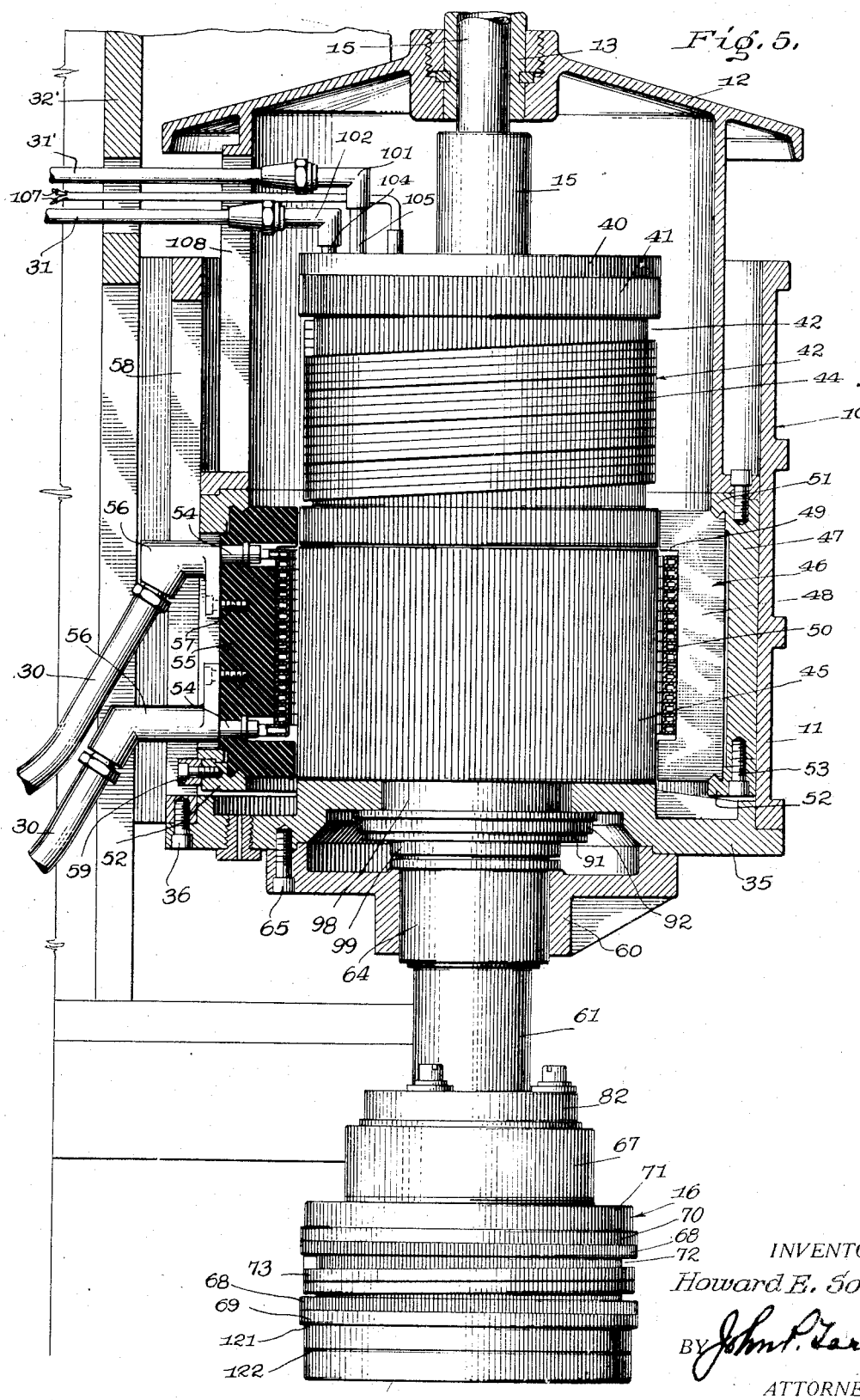
Fig. 5 is an enlarged view partly in section on the line 5—5 of Fig. 2 showing the switching transformer in uncoupled position.

Referring to the drawings in detail and first to Figs. 1 to 4, the apparatus consists in general of a switching transformer element 10 comprised of a stationary casing 11 in which is slidably mounted a primary element support 12 carrying a primary transformer element movable into and out of transformer coupling relation with a secondary element contained within the casing 11. The primary element support 12 is carried for such sliding movement by the hollow primary element carrier shaft 13 which is moved up and down by means of a suitable motor cylinder 14.

Tool shaft 15 extends through the hollow carrier shaft 13 and through the center of the switching transformer 10, and at its lower end carries the induction head 16. The tool shaft 15 is arranged for both sliding and rotary motion, the sliding motion being imparted by means of the motor cylinder 17 and the rotary motion by means of a gear 18 and elongated pinion 19 driven by an electric motor 20.

At the lower part of the apparatus assembly is mounted an adjustable work carriage 21 carrying a vertical movable work holder 22 for holding the work piece 23 in operative position relative to the induction head 16.

Cooling and quenching fluid is supplied to the induction head 16 and a quench nozzle 24 at the bottom of the head, through the tool shaft 15 which is made tubular for this purpose, and to which fluid is supplied through the upper tubular extension 25 arranged to receive fluid through a slide union 26 into which cooling and quenching fluid is supplied through the pipe 27 and the control valve 28 from a suitable supply line 29. Current is supplied to the primary of the transformer through suitable leads 30. A pair of multiple leads 31—31' connect the terminals of the transformer secondary winding to a group of capacitors 32 for power factor correction. The various main elements above mentioned are held in proper operative relation as shown by means of a suitable substantially rigid and strong framework 32'.

The switching transformer 10 is mounted on the main frame by means of the transformer casing 11 in the form of a bracket supported ring or short cylinder casing secured to the front plate element of the frame by means of the wing flanges 33 and the bolts 34. It is thus held stationary with respect to the frame. As shown more in detail in Figs. 5 and 6, the transformer casing 11 carries a bottom mounting ring 35 bolted to the lower end flange of the casing at 36, which mounting ring in turn carries a tubular secondary core support 37 bolted to the mounting ring 35 at 38. Near its center the secondary core support 37 carries an intermediate clamping flange 39 between which and a top clamping ring 40 are clamped an annular series of radial laminations 41 forming the magnetic core of the transformer secondary element 42. The radial laminations are preferably tapered as by grinding or other suitable process to form in effect a solid mass of laminated material. Within an outer recessed portion 43 of the core element thus formed by the laminations 41 is mounted the secondary winding 44 of the transformer consisting of a four-stranded tubular conductor as shown. Below the laminations 41 the core support 37 carries an auxiliary core element 45, also built up of taper-ground radial laminations clamped in place between the intermediate clamping flange 39 and the bottom mounting ring 35.

The primary transformer element 46 surrounding the secondary element 42 is mounted in a cylindrical primary element casing 47 carried by the primary element support 12 and arranged to slide in bearing contact with the stationary transformer casing 11. The primary transformer element 46 is comprised of an annular series of taper-ground radial laminations 48 forming an annular core element in an inner annular recessed portion 49 of which is mounted the primary winding 50 of the transformer formed of the usual hollow tubular conductor. The laminations 48 are clamped in place within the casing 47 between the top flange 51 and the bottom clamping ring 52 clamped onto the lower end of the casing 47 by suitable bolts 53.

Current is led to the primary winding 50 by means of the terminal elements 54 extending outwardly through a radially tapered block 55 of insulating material inserted between the core laminations, the terminal elements 54 connecting outside of the block with outside terminal elements 56 secured to the block through bolts 57. The outside terminals 56 are made in the form of electrical and fluid coupling elements for connection with suitable flexible water cooled current leads 30 connected with a suitable source of high frequency current supply and cooling fluid. The block 55 of insulating material is made in the form of a tapering wedge sufficiently thick to surround the terminal elements 54 and insulate them from the laminations, the insulating block 55 being clamped in place between the laminations in the same manner as the laminations are clamped, that is between the upper flange 51 of the casing 47 and the lower clamping ring 52, as is clearly shown at the left of Figs. 5 and 6. To prevent turning movement of the primary element with respect to the transformer casing 11, the casing is provided with a guide slot 58 with which engages a guide stud 59 carried by the sliding primary element. This slot 58 also affords an elongated opening for entrance of the terminals 56 through the casing to the primary element. The transformer primary element 46 is thus capable of sliding freely from the lowered position shown in Fig. 5 to its raised position shown in Fig. 6.

Slidably mounted within the hollow of the tubular secondary core support 37 is a hollow tool shaft 15 which has bearing at the bottom of the transformer casing in a bearing support 60 through an intervening conductor sleeve 61 surrounding the tool shaft but insulated therefrom by a sleeve 62 of insulating material. The conductor sleeve 61 has bearing in the bushing 63 which is mounted in the support 60 through the intermediation of an insulating bushing 64. Bolts 65 secure the support 60 to the bottom mounting ring 35. The lower end of the tool shaft 15 carries the induction head 16 as an enlarged portion thereof comprising an inner tubular extension 66 and an outer cylindrical extension 67. The outer tubular extension carries an annular series of taper-ground radial laminations 68 clamped in place between the bottom flange 69 on the cylindrical extension 67 and a top clamping ring 70 held down against the laminations by clamping ring-nut 71 threaded onto the outer cylindrical extension 67. Within an outer annular recess 72 in the ring of laminations 68 is mounted an inducting coil or work coil 73 formed from a tubular conductor. One terminal 74 of the coil 73 is electrically connected through an inwardly extending tubular member 75 with the inner extension 66 through the metallic terminal ring 76 through which the tubular extension 75 extends in a water tight connection to the inner opening of the inner extension 66, the terminal ring 76 being secured to the end of the extension 66 by means of suitable bolts 77. The other terminal 78 of the inducing coil is electrically connected through the coupling elements 79—80 and conducting rod 81 to the conductor sleeve 61, the conductor rod 81 making contact with the sleeve through the flange 82 into which it enters and with which it may be secured in any suitable manner as by brazing or in any other suitable manner. Fluid connection between the terminal 78 and fluid chamber 83 is afforded by means of an opening 84 formed in the coupling element 79 and arranged to have communication with the opening in the conductor terminal 78 and the liquid chamber 83.

Figure 6:
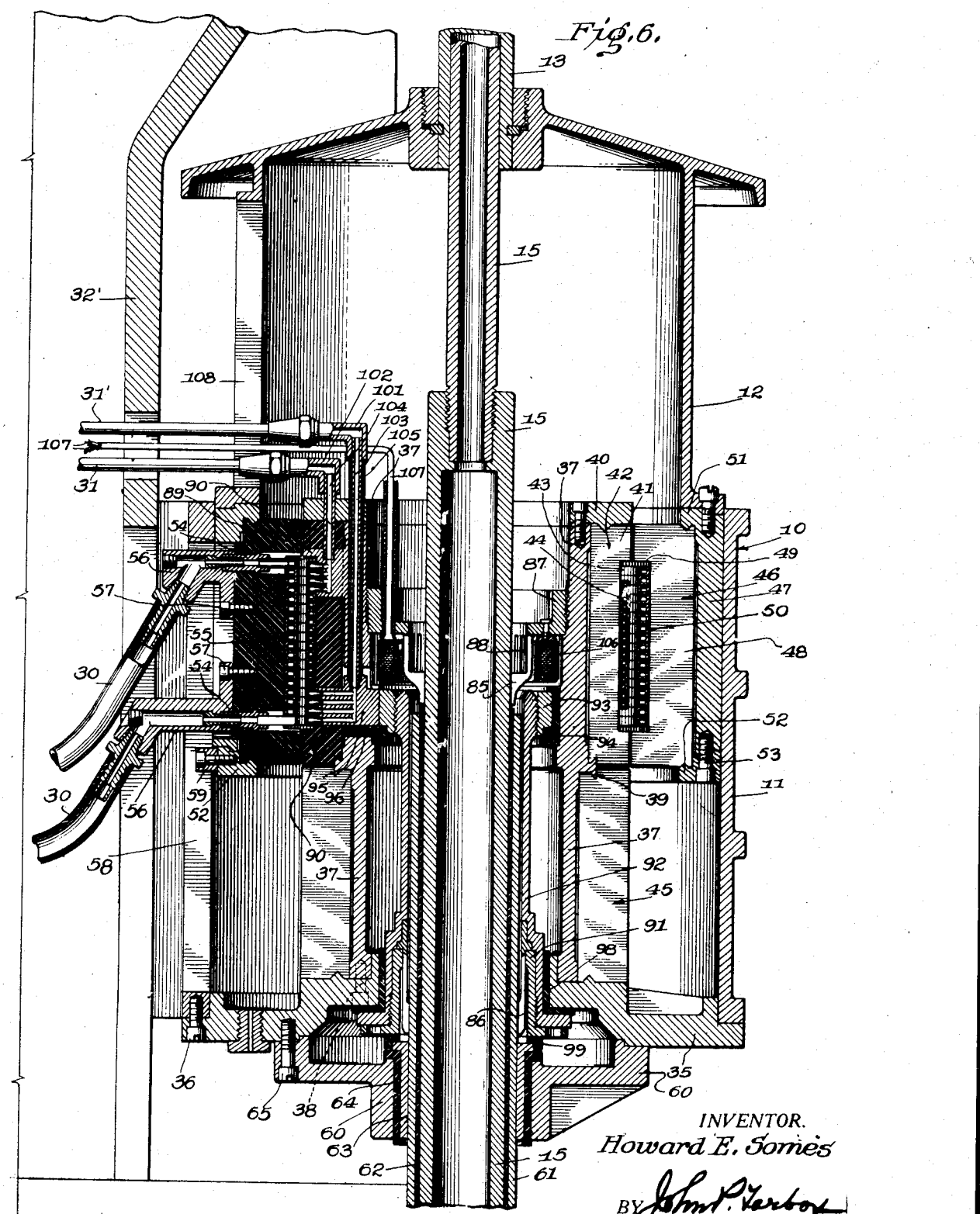
Fig. 6 is a cross sectional view taken on the line 5—5 of Fig. 2 showing the switching transformer in coupled position.

Thus the tool shaft 15 and conductor sleeve 61 form conductor leads extending from the work coil 73 up into the tubular secondary coil support 37 for electrical connection with the terminals of the transformer secondary winding 44. Such connection is effected through a pair of annular-form brushes 85 and 86 arranged to bear against the tool shaft 15 and conductor sleeve 61 respectively. Each of these brushes, for example, 85, has an upper base portion 87 in the form of a solid ring carrying an integral downwardly extending, thin walled cylindrical portion 88 slotted longitudinally from the bottom edge to the base at close intervals to form a plurality of downwardly extending narrow resilient fingers to press against the tool shaft. To enhance this resiliency, the brush elements are formed of suitable resilient conducting material such as beryllium copper. The upper brush 85 is secured to the inner wall of the secondary coil support 37 by means of its upper base portion 87 which is threaded into the inner wall of the tubular support 37. The tubular support being of conducting material, preferably a bronze casting, makes good electrical contact with the brush element through its threaded connection therewith and continues this connection to the upper terminal block 88 of the secondary coil which terminal, as shown in Fig. 6, is formed as an integral lug extending radially outwardly from the support 37 through the radially tapered block 90 of insulating material and into electrical contact with the upper terminal of the four-stranded conductor of the secondary coil. The lower brush element 86 is mounted within the tubular support 37 between a pair of cylindrical clamping elements 91 and 92 of conducting material, the outer conducting element 92 extending upwardly to near the lower end of the secondary coil where it is secured in electrical contact with a solid ring element 93 of conducting material by threaded engagement therewith, the ring element 93 being insulated from the tubular support element 37 by an annular bushing 94 of insulating material seated in an annular shouldered portion of the tubular support 37. The ring member 93, thus insulated from the support 37, is electrically connected with the lower or insulated terminal of the secondary winding through terminal block 95 which, as shown at the left in Fig. 6, is in electric contact with the conducting ring 93 and extends radially outwardly therefrom through the insulating block 90 into electrical contact with the lower terminal of the four-stranded conductor of the secondary winding. The wedge shaped insulating block 90 is of a circumferential thickness greater than that of the terminal plug 95 so as to surround the same and insulate it from the laminations. Where the plug 95 passes through the wall of the support element 37, it is insulated therefrom at the bottom by an insulating spacer element 96, the opening through the tubular support 37 being sufficiently high to afford air insulation between the plug 95 and the support 37 as indicated at 97. Similarly, the sides of the terminal block 95 may be air insulated from the support 37 by suitable spacing or may be separated by solid spacing members of insulating material as will be well understood by those skilled in the art. The clamping elements 91 and 92 are thus held firmly clamped in position together with the metallic bushing 63 through said insulating bushings by means of the lower bearing support 60 clamped onto the bottom mounting ring 35 by bolts 65. By vertically spacing the brushes 85 and 86 and having the conducting sleeve 61 extend upwardly to near the top brush when in the raised position as shown in Fig. 6, the tool shaft 15 and conductor sleeve 61 are enabled to be slid vertically for a distance substantially equal to such spacing while maintaining proper contact with the elements. Similarly, the tool shaft together with the conducting sleeve 61 may be rotated without affecting the continuous contact of the brushes with the shaft and conductor sleeve.

The multiple leads 31, 31' afford a multiple connection from the terminals of the secondary coil to the bank of capacitors 32 for power factor correction of the secondary circuit, as well as means for supplying cooling fluid to the secondary coil. This double function is obtained in general in the usual manner by providing such leads in the form of hollow conductors properly connected to the coil terminals for establishment of both electrical and fluid connection therewith. To effect this connection the flexible tubes 31, 31' of conducting material are connected through electrical and fluid, conducting angle joints 101 and 102 to conducting tubes 103 and 104 respectively which extend down into electrical and fluid connection with the terminals of the four-stranded conductor of the secondary winding through the terminal blocks 88 and 95, the conductor tube 103 leading to the insulated terminal block 95 being insulated from the support element 37 by means of an outer insulating tube 105. The multiple leads 31, 31' are electrically connected with a bank of capacitors and are mechanically connected to suitable insulating tubing which has rubber hose to a suitable source of cooling fluid such as water, which connections and source are not here shown, it being understood that such may be established in any manner known in the art.

For indicating the volume of current flowing in the secondary circuit through the brush elements 85, 86 a current-ratio transformer 106 is provided in the form of a toroid extending around the outer circumference of the upper brush element 85 so that the current passing from the terminals of the secondary through the brush elements will loop through and around the toroid. By so placing the current transformer, its magnetic and electrical circuits are positioned at right angles to the electrical and magnetic circuits, respectively, of the primary coil, thus rendering it substantially uninfluenced by current in the primary coil. The current transformer 106 is connected through a pair of leads 107 extending out through the slot opening 108 in the primary element support 12, to a suitable indicating instrument not shown.

The electrical circuit connection between the work coil 73 and the transformer secondary winding 44 may be traced from; grounded secondary terminal block 88, support element 37, base ring 87 of brush 85, brush 85, tool shaft 15, inner extension 66 of induction head 16, terminal extension 75 of the lower grounded terminal 74 of work coil 73, through work coil 73, upper insulated terminal 78 of the work coil, insulated terminal connections 79 and 80, insulated connecting bolt 81, insulated conductor sleeve 61, to lower brush element 86, and thence to conductor extension 92 and insulated terminal block 95, back to the secondary winding through the lower insulated terminal of the winding.

Motion is imparted to the transformer primary element 46 to move it from the lower uncoupled position shown in Fig. 5 to the upper coupled position shown in Fig. 6, and vice versa, through the primary element support 12 and its hollow carrier shaft 13 by the piston 106 (Fig. 4) of the fluid motor 14, to which piston the carrier shaft 13 is fixed. Movement of the piston 106 is effected by admission and release of air or other working fluid into and from the work cylinder 14 at opposite sides of the piston through a suitable slide valve 107 controlled in known manner by an electro-magnetically actuated control valve 108 (Fig. 2). As various types of such controls are well-known in the art, it is deemed unnecessary to describe the same in detail. Suffice it to say that the controls are so arranged that normally the piston 106 is in the lower position and upon energization of the electro-magnetic control valve 108, is raised to the top position and held there during such energization, and upon deenergization of the control valve, is returned to the lower position. Vertical sliding movement of the tool shaft 15 through the switching transformer and the hollow carrier shaft 13 is effected by the work piston 109 in work cylinder 17, to which piston the tool shaft 15 is attached for sliding movement therewith. The work piston 109 is operated by admission and release of air or other working fluid to opposite sides of the piston in known manner as described in connection with the operation of the work cylinder 14, the operation of the cylinder 17 being controlled through the slide valve 110 and electro-magnetically actuated control valve 111 (Fig. 2) in a manner such that normally the piston 109 will remain in the lowermost position and upon energization of its controlling electro-magnetic valve 111 will be raised to the upper-most position and held there during such energization and upon de-energization of the control valve will be returned to the lowermost position. Rotary motion is imparted to the shaft 15, independently of its vertical movement, through the gear 18 fixed to the upper end of the shaft 15, and elongated pinion 19, from a suitable electric motor 20. An upper extension 25 in the form of a tube closed at the top is secured in the upper end of the hollow tool carrier shaft 15 for conduction of quenching fluid to the hollow shaft 15 uninterrupted by the sliding and rotary motion thereof, to which end the tubular extension 25 extends upwardly into a slide union 26 in the form of a cylindrical chamber element in which the tubular extension 25 is arranged to slide and rotate through fluid tight stuffing boxes 112, 113. The interior of the tubular extension 25 communicates with the interior of the slide union 26 through an opening 114, and cooling and quenching fluid is supplied to the interior of the union 26 through the conduit 27 (Fig. 2), electro-magnetically controlled valve 28 and conduit 29 from a suitable source of such fluid under pressure not shown.

Figure 7:
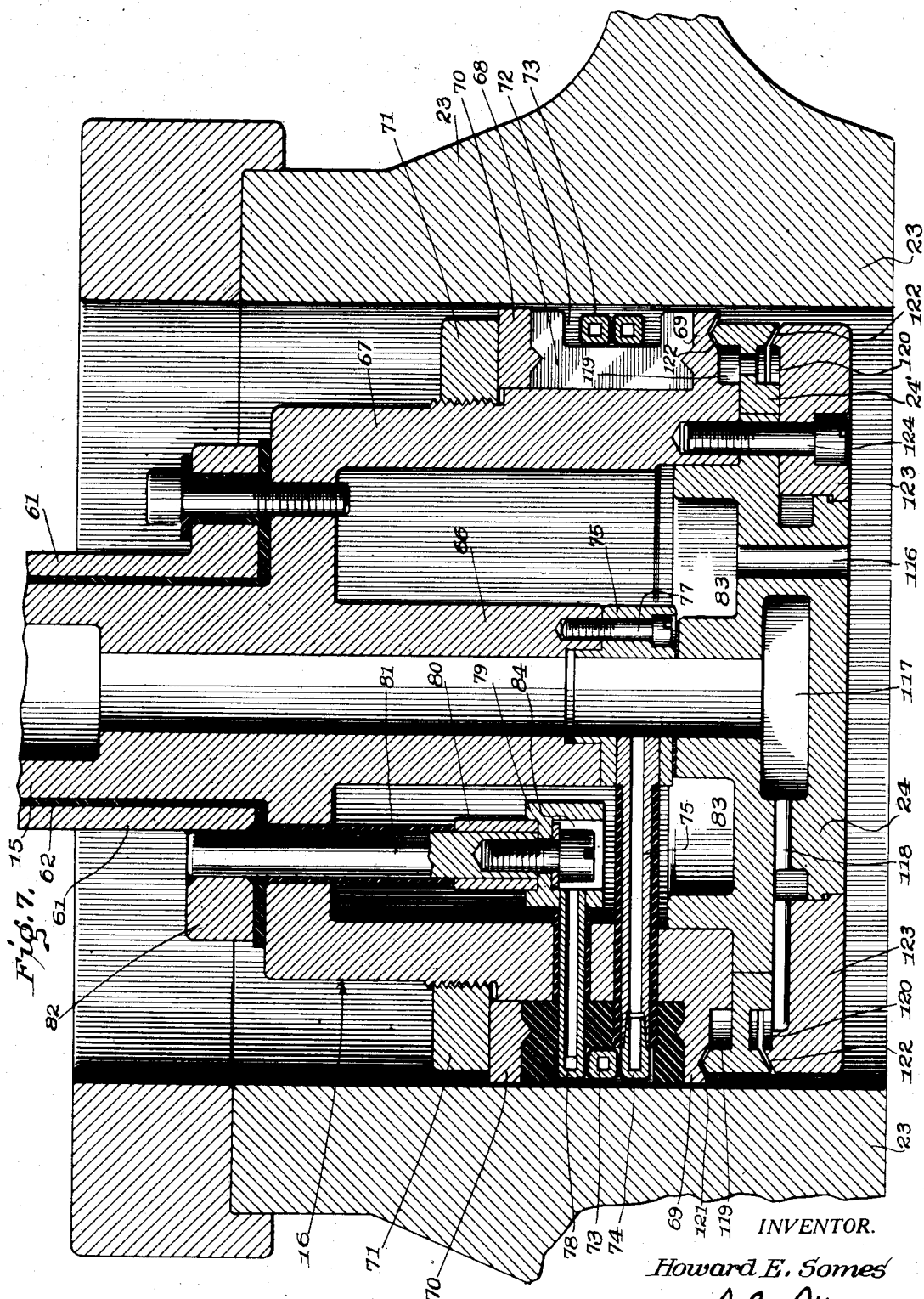
Fig. 7 is an axial section through the induction head taken on the line 7—7 of Fig. 1, and on an enlarged scale.

The cooling and quenching fluid supplied through union 26 (Fig. 4) and controlled in its flow by valve 28 (Fig. 2) is conducted on down through the extension 25 and hollow tube shaft 15 to the induction head 16 and nozzle 24 (Fig. 7). The cooling fluid passing into the tubular channel through the inner extension 66 of the induction head (Fig. 7) is conducted through the channel in the terminal extension 75 to the lower terminal 74 of the work coil and thence through the work coil and out through the upper terminal 78 and lower opening in the coupling element 84 into the annular chamber 83 in the nozzle cap 24. From the chamber 83 the cooling fluid exhausts through an annular series of exhaust openings 116 in the nozzle cap 24.

For quenching, the cooling and quenching fluid moving on down through the inner channel in the inner extension 66 to the central chamber 117 in the nozzle cap, is distributed radially therefrom through radially extending channels 118 to the upper and lower annular passages 119 and 120 and out through the radial spray slots 121 and 122 respectively, from which the fluid is forced downwardly and outwardly from below flange 69 to impinge against the heated portion of the work being treated which portion, in the present showing, is the inner surface of the hub of a car wheel here shown as the workpiece 23. The width of the annular slots 121 and 122 is determined and fixed by proper dimensioning of the intermediate nozzle member 24' and the outer ring element 123 by which latter the intermediate element 24' is clamped in position through a series of clamping bolts 124. It is to be noted that the surfaces of the spray slots 121 and 122 are inclined downwardly with respect to the horizontal in a direction away from the direction of movement of the heating head and that as a result of such inclination the quenching fluid will not react or reflect from the surface being quenched to contact the inducing coil or the immediate surface being heated.

Below the induction head 16 an adjustable work platform 21 is slidably mounted on a pair of uprights 125 forming part of the main frame structure 32', and is arranged to be moved up and down by a pair of elevating screws 126 driven through a set of bevel gears 127 and transmission shafts 128 from the stub shaft 129 square ended for engagement by a suitable operating crank not shown. As shown more in detail in Fig. 8, the work platform 21 carries a vertically movable work holder 22 mounted for vertical movement on the platform by means of a set of three guide rods 130 slidably mounted in the tubular guide members 131 and the platform 21. The work holder 22 connects with guide rods 130 for movement thereby through short studs 132 on the upper end of the rods which engage through openings 133 in the work holder 22 thus enabling various interchangeable work holders provided with like arrangements of openings 133 to be used in place of the work holder 22, where required. The three slide rods 130 are connected at their bottom ends for movement as a unit by a yoke member 134. The yoke 134 is arranged to be raised and lowered by a work cylinder 135 mounted in the lower part of the well 136 forming a part of the work platform. The work cylinder is provided with work piston 137 which carries the tubular shaft 138 connected at its lower end to the lower end of a central downwardly extending yoke offset portion 139. Operating fluid connection with the top and bottom of the work cylinder is had through suitable pipe connections 140, 141 (Fig. 9) leading from suitable fluid control mechanism not shown.

Figure 8:
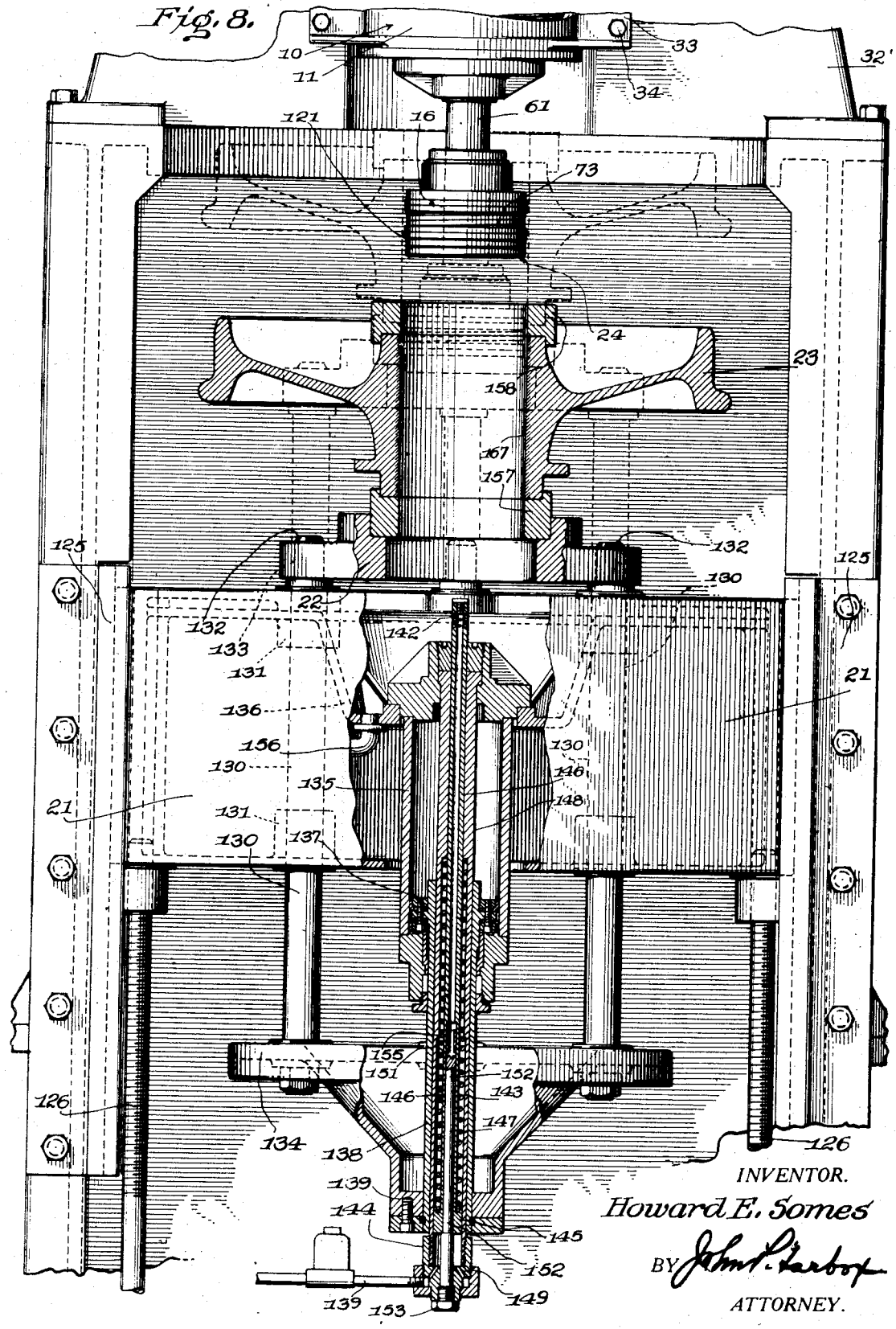
Fig. 8 is an enlarged front elevation, partly in axial section, showing the work holding portion of the machine.

Mounted centrally of the work carriage and extending through the work cylinder 135 for application to the work, is a bottom, movable spray nozzle element 142 arranged to be moved from the lower position shown (Figs. 8 and 9) up into operating position with relation to the work by means of an elongated work cylinder 143 extending down through the work cylinder 135 and hollow shaft 138 through and below the yoke offset 139 where it terminates in a bottom cylinder head 144. This elongated work cylinder is provided with a work piston 145 which carries the movable nozzle tube 146 normally held in its lowermost position by means of a compression spring 147 bearing at its lower end against the top of the piston 145 and at its upper end against an inner shouldered portion 148 in the wall of the elongated work cylinder. Operating fluid is supplied to the bottom end of the work cylinder 143 through supply pipe 139 (Fig. 8) and inlet ducts 149 in the cylinder head 144, which operating fluid is also used as the quenching fluid for the nozzle 142. To permit entrance of fluid to the nozzle tube 146 only during elevated position of the nozzle 142, a stationary sleeve valve 150 (Fig. 9) having valve openings 151 normally closed by the walls of nozzle tube 146 is mounted on a valve stem 152 extending downwardly through the nozzle tube and secured at the bottom of the cylinder head 144 through a threaded and capped end portion 153. As will be clear from the drawings especially Fig. 9, communication between the interior of the sleeve valve 150 and the piston chamber 154 will be effected upon movement of the piston 145 into its uppermost position in abutment with the shoulder 155, by movement of the bottom end of the piston upwardly beyond the valve openings 151. The waste quench fluid from the nozzle 142 as well as from the quenching nozzle 24 on the induction head 16 collects in the platform well 136 from whence it is drained off through drain pipe 156 (Fig. 8).

The cylindrical work piece 23 here shown as a car wheel is mounted on the work holder 22 through the intermediation of a bottom end-ring 157, the work being capped by a top end-ring 158. The purpose of the end rings is to provide a temporary continuation of the work piece beyond the portions to be treated to avoid undesirable electro-magnetic end effects at the ends of the actual work-piece. For this purpose, the end-rings are perfectly formed of a material substantially the electro-magnetic equivalent of the material of the work-piece.

On relatively large work such as the workpiece 23 here shown, where an induction head of the type 16 effects the treatment by upward movement through the work-piece during energization, the quenching nozzle 24 carried by the induction head is ordinarily relied upon for effecting the quenching at the proper temperature, the lower movable quenching nozzle 142 being used mainly for smaller work such as automobile wheel hubs and small engine cylinders, although, on occasion, where desirable both types of quenching nozzles may be used on the one work-piece, for example the nozzle 24 carried by the induction head 16 may be used for bringing the work-piece to the desired quenching temperature progressively upwardly with the upward movement of the induction head, after which further cooling of the work may be effected through use of the bottom quenching nozzle 142.

An important detail feature of the various work cylinders is the arrangement for cushioning the end stroke of the piston. As such arrangement is substantially the same for the various work cylinders, it will suffice to refer in detail to one, for example the work cylinder 14 (Fig. 4). Here it will be seen that the bottom cylinder head 159 is provided with a cylindrical passage 160 about the carrier shaft 13 through which the work cylinder chamber communicates with the inlet-outlet duct 161 in the cylinder head, which cylindrical passage 160 is arranged to be closed by the enlarged portion 162 of the carrier shaft 13 during the latter or end portion of the downward stroke of the piston, thereby cutting off the exit of working fluid from the cylinder chamber through the opening 160 and confining its exit to the duct 161 by way of by-pass channel 100 controlled by a needle valve 163. Thus by suitable adjustment of the needle valve 163, the rate of exhaust of working fluid from the cylinder at the end of the stroke may be adjusted to give any desired cushioning effect. The upper end of the work cylinder is constructed similarly to that of the lower end for effecting a regulated cushioning at the end of the up stroke. Here also a needle valve and by-pass duct, not shown, is provided for controlling communication between the opening 164 and the inlet-outlet channel 165.

In operation, assuming the work platform 21 to be adjusted to the position shown in Figs. 1 and 2 for operating on the car wheel 23, the work holder in the lower position as shown in Figs. 1, 2 and 7, the induction head in the upper position as shown in Figs. 1 and 2, and the primary element of the switching transformer in the lower uncoupled position as shown in Fig. 5, the operator positions the work-piece 23 on the work holder with the end-rings 57—58 in position as shown in Figs. 1, 2 and 7. Working fluid is now let into the bottom of the elevating cylinder 135 (Figs. 8 and 9) through the pipe 141 and suitable control means not shown to elevate the work holder 22 and work-piece 23 up into a position shown in dotted lines in Fig. 8. While the work-piece is held in this elevated position, electromagnetic valve 111 (Figs. 1 and 2) is actuated to effect admission of working fluid to the top of cylinder 17 which moving downwardly moves the tool shaft 15 and induction head 16 downwardly into and through the hub of the car wheel 23 to the position shown in dotted lines in Fig. 8 slightly below the lower edge of the hub but within the lower end-ring 157 which has been raised with the work. This puts the heat treating head 16 in the starting position. Electromagnetic valve 108, Fig. 2, is now operated to admit working fluid under pressure to the lower end of work cylinder 14 to quickly raise the primary element support 12 and with it the transformer primary element 46 (Figs. 5 and 6) from the uncoupled position shown in Fig. 5 to the coupled position shown in Fig. 6, whereupon the secondary winding 24 becomes energized, delivering current through the conductor extensions formed by the tool shaft 15 and conducting sleeve 61 to the work coil 73 (Figs. 5 and 7) as heretofore described. The work coil 73 being now energized induces a heating current in the lower ring element 157. Substantially at the same instant, electromagnetic valve 28 is actuated admitting cooling and quenching fluid through the slide union 26 and on down through the tubular work shaft 15 to the induction head 16. The quenching fluid passing partly through the work coil to cool the same, thence out through the bottom of the induction head, and partly through the slot openings in the nozzle head 24 to impinge against the surrounding surface of the bottom end-ring element 157. Also at substantially the same instant the induction head 16 is started on an upward movement and the work holder with the work-piece 23 started on the downward movement at predetermined rates so as to move the work-piece with its end-rings and the induction head from the position shown in dotted lines in Fig. 8 to the position shown in solid lines in Fig. 8. Upward movement of the induction head 16 at predetermined rate is effected by actuation of the electromagnetic valve 111 of the work cylinder 17 (Figs. 1, 2 and 4) to release working fluid from the top of the working cylinder 17 and admit working fluid to the bottom of the cylinder at a predetermined constant rate of flow which may be regulated by the needle valve 166 (Fig. 2) or other suitable means. Similarly, regulated downward movement of the work is effected by suitable regulated control of the flow of working fluid out of the bottom and into the top of the work cylinder 135 through pipes 141 and 140. To assure accuracy in control a noncompressible operating fluid may be used, having its rate of flow positively controlled as by a gear pump or other suitable flow control means. As the inductor head 16 moves upwardly through the work-piece from the position shown in dotted lines in Fig. 8 to the position shown in solid lines, the annular zone of induced heating current moves upwardly at uniform rate from the lower end-ring 157 through the inner cylindrical wall portion of the work-piece to the top end-ring 158, followed immediately by the cooling effect of the quenching spray delivered from the quenching nozzle 24, to effect uniform heat treatment of the work-piece throughout an interior annular zone as indicated at 167 by the heavy hatching in Fig. 7.

When the induction head reaches a position just ready to emerge from the top end-ring 158, the work coil 73 is immediately de-energized by deenergization of electro-magnetic valve 108 (Fig. 2) to release working fluid from the bottom of work cylinder 14 and admit working fluid to the top thereof, to effect movement of the transformer primary element 46 (Figs. 5 and 6) from the upper position of Fig. 6 back to the lower uncoupled position of Fig. 5 thus de-energizing the secondary winding. It will be noted that this switching off of the current is effected without undue change in the electrical characteristics of the primary circuit due to substitution of the auxiliary laminated core element 45 for the core element of the secondary winding, in a manner and through the use of a structure similar to that disclosed in my co-pending application Serial No. 96,929, filed August 20, 1936. The induction head and work piece continue their relative movement until both spray slots 121 and 122 are above the upper edge of the work piece 23 and still within the upper end-ring 158 whereupon they pause in their relative movement to permit the quenching spray to continue to wash the entire inner wall of the work piece for a determinate time sufficient to insure complete quenching of the upper portions. Thereafter the electromagnetic valve element 28 (Fig. 2) is actuated to shut off the cooling and quenching fluid. The induction head and work piece 23 then continue their relative movement to bring them into the position shown in solid lines in Fig. 8 which is the same as the load and unload position shown in Figs. 1 and 2, after which the work-piece 23 may be removed, substituted by an untreated work-piece and the operation repeated as above described.

In the operation above described, after the induction head is de-energized, the necessity for accurately timed relative movement between the induction head and the work piece no longer exists so that these two parts may be moved either at the same or different times and at any speed convenient to the carrying out of the remainder of the operation. For example, after de-energization of the induction head, either the induction head or the work piece, or both may be rapidly moved to position the spray slots above the upper end of the work piece within the upper end-ring 158, and after the pause for additional quenching the parts may be rapidly moved away from each other into the unload position shown in solid lines in Fig. 8.

In the operation above described it is to be understood, of course, that the quenching and cooling fluid will be supplied at such volume and pressure that the back pressure built up in the chamber 117 due to the restricted flow through the continuously open annular nozzle passages 121 and 122 will be sufficient to force the cooling fluid through the coil 73 from the trailing terminal thereof to the leading terminal in the direction of progressive movement of the heating head through the workpiece.

It is to be noted that by arranging the nozzle passage 121 at the under side of the abutment flange 69 for the core 68 an annular jet or sheet of cooling fluid will issue substantially directly from the lower edge of the flange 69 with the result that the zone of the initial contact of the quenching fluid with the workpiece is brought into extremely close proximity to the trailing end of the heated zone which is the hottest portion of the heated zone due to its relatively longer exposure to the heating influence of the heat treating head. It is to be noted further that an advantage of the arrangement whereby the cooling fluid is directed through the hollow conductor of the coil 73 from the bottom to the top, that is, in the direction of travel of the coil 73 relative to the workpiece, is that that part of the coil which is presented to the hottest portion of the progressing heated zone is the first to receive the cooling fluid. Also, because the coil is intended to travel upwardly through the workpiece with the result that it is the lowest terminal of the coil which is presented to the hottest part of the heated zone, this is the one selected for connection with the mandrel 15 whereby that portion of the coil is maintained at substantially the same potential as the workpiece.

It is desirable at times to rotate the work piece during treatment thereof and to this end I provide the rotatable work holder 170 (Figs. 10 to 13) mounted in a casing 171 adapted to be positioned on the work holder carriage posts 130. The work holder 170 is annular in form and has rotatable bearing in the casing 171 through a V-shaped bearing ring 172 carried by the holder slidable in the complementary annular V-shaped trough 173 formed in the casing. The rotation of the holder 170 is effected by means of a worm-gear ring 174 and worm 175 driven through bevel gears 176 by an electric motor 177. The motor 177 is mounted by means of a bracket extension 178 carried by the casing 171. A cover ring 194 secured to the casing 171 by screws 195 (Fig. 10) guards the work holder against upward displacement and shields the driving mechanism from the quenching fluid. The work piece 179 which in the present instance is an automobile wheel hub, is held centered in position in the work holder through the intermediation of a ring shaped adaptor element 180 fastened to the holder 170 by suitable cap screws 181. To insure a positive holding of the work in fixed relation to the movable work holder 170 a pair of chucking jaws 182 are mounted on the bottom of the work holder and arranged to be moved into engagement with the lower end of the work piece by means of the fluid operated work cylinders 183. The chucking jaws 182 are each arranged to be operated by its work cylinder 183 through a piston rod 184 carried at the end of a hollow cylindrical piston element 185 normally held by a compression spring 186 in its radially innermost position to normally hold the chucking jaws 183 in clamping position under spring tension, fluid under pressure being admitted to the forward side of the piston through supply pipe 187 to retract the chucking jaws into open position for placement and withdrawal of the work. In the present instance the chucking jaws are shaped and arranged to engage the work piece through the annular hub-puller recess normally provided in such work piece.

Also mounted at the bottom of the casing 171 on opposite sides of the central opening are a pair of control switches 188 and 189 operated by levers 190 and 191 respectively positioned to be actuated by engagement of the lower end of the work piece 179 therewith. The purpose of these switches is to control suitable safety control circuits not shown which do not form an essential part of the present invention and which may form part of a sequence control system for the machine similar to that shown in my co-pending application Serial No. 96,346, filed August 17, 1936. Suffice it to say here that the switches 188 and 189 are of a type which are normally open and are adapted to be closed upon upward movement of their operating plungers 192. Thus, as shown in Fig. 12, the switch 188 is shown with its plunger 192 held up by the lever 190 to maintain the switch in closed position, while the switch 189 is shown with its plunger released by downward movement of the lever 191 to maintain the switch in open position, the levers 190 and 191 being so held by engagement of the lower end of the work piece therewith. Thus with the work piece in place the switch 188 is held closed while the switch 189 is held open. Immediately upon removal of the work piece the levers 190 and 191 are permitted to move upwardly to open the switch 188 and close the switch 189. Upward movement of the lever 191 with sufficient force to actuate the switch 189 is effected by means of a suitable compression spring 193 while the retractile spring normally provided as part of the switch 188, but not here shown, is relied upon to raise the lever 190 through downward movement of the switch plunger 192 by such retractile spring.

Where the work holder 170 is used in place of the work holder 22 of Fig. 8 and to adapt the machine for operation on smaller work such as the hub 179 (Fig. 12), the induction head 16 of Figs. 1 to 8 is replaced by the smaller induction head 16' of Fig. 12 suitably designed for operative engagement with the work piece 179 and carried at the end of a sleeve conductor 61' and tool shaft 15' replacing the sleeve conductor 61 and tool shaft 15 of Figs. 1 to 8.

With the use of the rotatable work holder 170 shown in Figs. 10 to 13 the work piece 179 may be raised and lowered into and out of operative relation with the induction head 16' as well as rotated relative thereto, without movement of the induction head, which is convenient and preferable where operating on small work pieces such as the automobile wheel hub 179. Also, where it is desired to attain high relative rotational movement between the work piece and the induction head both such elements may be rotated in opposite directions thus avoiding any such undue vibration as would occur under the same relative rotational velocity attained by movement of one of the elements alone.

In operating on smaller work pieces such as the wheel hub 179 it is preferable to effect a sudden quenching of the entire treated surface at one time which is most conveniently attained through use of the bottom quenching nozzle 142 which in Fig. 12 is shown in the uppermost or active quenching position. It is in such position that the quenching fluid will be supplied to the nozzle through the valve openings 151, Fig. 9, as described in connection with Figs. 8 and 9.

It is further to be pointed out that with the improved form of heating coil shown in Fig. 7 in which the axial extent is extremely short compared with the diameter so that the magnetic circuit is restricted in axial extent to several times less than the diameter, the depth of the high density magnetic flux and consequently the depth of the treated zone may be kept small, and this regardless of the size of the work piece.

What I claim is:

1. Apparatus for heat treating a work piece by electro-magnetic induction comprising a stationary support, a work holder for holding the work piece, a tool shaft slidably mounted on said support and having a channel therein, an induction head carried by said shaft for movement with the shaft into and out of operative heating relation with the work piece held in said work holder, a tubular heating coil carried by said induction head, and a quenching nozzle carried by the induction head having fluid connection with the channel in said tool shaft, one terminal of said tubular coil communicating with the channel in said shaft and the other terminal communicating with a space beyond the nozzle on the side away from the induction head.

2. Apparatus for heat treating a portion of a work piece by electro-magnetic induction comprising a supporting frame, a work support slidably mounted on said frame, means for holding a work piece on said support, an induction head slidably mounted on said supporting frame for movement into and out of operative heating relation with the work piece held by said holding means, a spray nozzle mounted on said work support independently of said frame and arranged for movement into and out of spraying relation with work piece held by said holder, and motor means mounted on said work support independently of said frame for moving said nozzle into and out of spraying relation with the work piece.

3. Apparatus for heat treating a work piece by electro-magnetic induction comprising a supporting frame, a work cylinder mounted on the frame, a work piston in said cylinder, a tool shaft connected to the piston for operation thereby as a piston rod, a work holder, an induction head carried by the shaft for movement into and out of operative relation with a work piece held by said work holder, a main inlet-outlet conduit communicating with the interior of said work cylinder for admission and release of working fluid to and from the interior of the cylinder, means movable with the piston to close off communication between the said conduit and the exhaust end of the cylinder near the end of a piston stroke, and a by-pass conduit permanently connecting said inlet-outlet conduit with said exhaust end of the cylinder independently of said means movable with the piston.

4. Apparatus for heat treating a work piece by electro-magnetic induction comprising a stationary supporting frame, a work holder casing mounted on said supporting frame, a work holder rotatably mounted in said casing, motor means mounted on said casing for rotating said work holder, a tool shaft slidably mounted on said frame, and an induction heating element carried by said shaft for movement into and out of operative relation with a work piece held by said holder independently of the rotary motion of the work piece by said holder.

5. Apparatus for heat treating a work piece by electro-magnetic induction comprising a transformer having a secondary winding and a hollow core therefor, a tool shaft extending through said core and being movable relative thereto, an induction heating coil carried by said tool shaft for movement therewith relative to the work piece, a circuit conductor element carried by said tool shaft, said conductor element and said tool shaft being insulated from each other and connected to the terminals of said coil, and means for maintaining electrical connection between the terminals of said winding and said conductor element and shaft during relative motion between said tool shaft and said transformer.

6. Apparatus for heat treating a work piece by electro-magnetic induction comprising a stationary secondary transformer element having a hollow core, a work holder, a tool shaft extending through the hollow core and mounted for sliding movement therethrough, an induction head carried by said tool shaft for movement into and out of operative relation with a work piece held by said work holder, extensible circuit connections connecting the terminals of said induction head with the terminals of said secondary element, and a primary transformer element surrounding said secondary element.

7. Apparatus for heat treating a work piece by electro-magnetic induction comprising a stationary support, a transformer mounted on said support having a hollow core element and primary and secondary elements relatively movable into and out of coupled relation, a work holder mounted on said support for holding a work piece to be treated, a tool shaft mounted to slide through the hollow core of the transformer independently of said relative movement between the transformer elements, an induction head carried near one end of the tool shaft for movement into and out of cooperative heating relation with the work piece held by said holder, a heating coil carried by said induction head, said tool shaft including a pair of concentric, cylindrical, electrical conducting portions electrically connected with the terminals of the said heating coil, and a pair of contact-brush elements connecting the terminals of the transformer secondary element each with one of the said cylindrical conducting portions.

8. Apparatus for heat treating a work piece by electro-magnetic induction comprising a stationary support, a transformer mounted on said support having a hollow core element and primary and secondary elements relatively movable into and out of coupled relation, a work holder mounted on said support for holding a work piece to be treated, a tool shaft mounted to slide through the hollow core of the transfomer independently of said relative movement between the transformer elements, an induction head carried near one end of the tool shaft for movement into and out of cooperative heating relation with the work piece held by said holder, a heating coil carried by said induction head, said shaft including a pair of concentric, cylindrical, electrical conducting portions electrically connected with the terminals of the said heating coil, and a pair of contact-brush elements connecting the terminals of the transformer secondary element each with one of the said cylindrical conducting portions, together with means for imparting sliding motion to the shaft and means for imparting rotary motion to the shaft to effect sliding and rotary motion of the induction head relative to the work piece held in said holder.

9. Apparatus for heat treating a work piece by electro-magnetic induction comprising a stationary support, a transformer mounted on said support having a hollow core element and primary and secondary elements relatively movable into and out of coupled relation, a work holder mounted on said support for holding a work piece to be treated, a tool shaft mounted to slide through the hollow core of the transformer independently of said relative movement between the transformer elements, an induction head carried near one end of the tool shaft for movement into and out of cooperative heating relation with the work piece held by said holder, a heating coil carried by said induction head, said shaft including a pair of concentric, cylindrical, electrical conducting portions electrically connected with the terminals of the said heating coil, and a pair of contact-brush elements connecting the terminals of the transformer secondary element each with one of the said cylindrical conducting portions, together with means for rotating the work holder relative to the induction head.

10. Apparatus for heat treating a work piece by electro-magnetic induction comprising a stationary support, a transformer mounted on said support having a hollow core element and primary and secondary elements relatively movable into and out of coupled relation, a work holder mounted on said support for holding a work piece to be treated, a tool shaft mounted to slide through the hollow core of the transformer independently of said relative movement between the transformer elements, an induction head carried near the lower end of the tool shaft for movement into and out of cooperative heating relation with the work piece held by said holder, an energizing coil carried by said induction head, said shaft including a pair of concentric, cylindrical, electrical conducting portions electrically connected with the terminals of the said heating coil, and a pair of contact-brush elements connecting the terminals of the transformer secondary element each with one of the said cylindrical conducting portions, together with motor means for moving said shaft, and a separable joint in said shaft between the motor means and said contact-brushes for replacement of the parts carried by the shaft below the joint.

11. Apparatus for heat treating a work piece by electro-magnetic induction which comprises a hollow core power transformer, a tool shaft extending through the hollow core of the transformer and movable relative thereto, an induction heating coil carried by the tool shaft for movement relative to the work piece, said shaft including a pair of circuit conductor elements carried by the shaft and connected to the terminals of the coil, means for maintaining electrical connection from said circuit conductor elements to the secondary terminals of the transformer during relative motion between said tool shaft and the transformer, and a third, current transformer winding mounted within the hollow core of the transformer in inductive relation to the current path through the said means for maintaining electrical connection.

12. Apparatus as claimed in claim 11 in which the third, current transformer winding is arranged with its magnetic circuit and current circuit at substantially right angles to those of the power transformer.

13. Apparatus for heat treating a work piece by electro-magnetic induction comprising a support, a hollow magnetic core element mounted on said support, a secondary transformer winding on said core, a primary transformer element including a primary winding and outer cylindrical magnetic circuit element proportioned and arranged to slide over said hollow magnetic core and secondary winding into and out of inductive coupling therewith, motor means for moving said primary element into and out of coupling position, a tool shaft extending through said hollow core, an induction head carried by the shaft, motor means for moving the shaft axially relative to said core to move the induction head into and out of operative relation with a work piece, circuit connections leading from the terminals of said secondary winding into the interior of the core to said shaft and circuit connections leading along said shaft to said induction head.

14. Apparatus for heat treating a work piece by electro-magnetic induction comprising a hollow core transformer, a tool shaft slidably extending through the hollow core of the transformer, means for effecting relative sliding movement between the tool shaft and the hollow core, an induction heating coil carried by said tool shaft, means for effecting relative movement between the heating coil and the work piece, said shaft including circuit conductor elements connected to the terminals of said coil, and means for maintaining electrical connection from said circuit conductor elements to the secondary terminals of the transformer during the relative movement between the said tool shaft and said transformer.

15. Apparatus for heat treating a work piece by electro-magnetic induction comprising a stationary support, a transformer mounted on said support having a hollow core element and primary and secondary elements relatively movable into and out of coupled relation, a work holder mounted on said support for holding a work piece to be treated, a tool shaft extending through the hollow core of the transformer, means for effecting relative sliding movement between the tool shaft and the hollow core independently of said relative movement between the transformer elements, an induction head carried near one end of the tool shaft, means for effecting relative movement between the work holder and the tool shaft to move the induction head and the work piece held by said holder into and out of operative relation, a heating coil carried by said induction head, said shaft including a pair of concentric cylindrical conducting portions electrically connected with the terminals of the said heating coil and a pair of contact brush elements connecting the terminals of the transformer secondary element each with one of the said cylindrical conducting portions, together with means for effecting relative motion between the tool shaft and the work holder.

16. Apparatus for heat treating a work piece by electro-magnetic induction comprising a stationary support, a transformer mounted on said support having primary and secondary elements relatively movable into and out of coupled relation, a work holder mounted on said support for holding a work piece to be treated, a tool shaft slidably mounted with respect to said work holder, an induction head carried near one end of the tool shaft, means for effecting relative movement between the work holder and the tool shaft to move the induction head and the work piece held by said holder into and out of operative relation, a heating energizing coil carried by said induction head, said shaft including a pair of electrical conducting portions electrically connected with the terminals of the said heating coil and a pair of contact brush elements connecting the terminals of the transformer secondary element each with one of the said conducting portions, together with means for effecting relative rotation between the tool shaft and the work holder.

17. Apparatus for heat treating a work piece by electro-magnetic induction comprising a stationary support, a work holder for holding the work piece slidably mounted on said support, a tool shaft slidably mounted on said support, a fluid conduit carried by the shaft, an induction head carried by said shaft, means for effecting relative movement between the shaft and the work holder for bringing the induction head and work piece held by said holder into operative relation, a tubular-conductor heating coil carried by said induction head, and a quenching nozzle carried by the induction head having fluid connection with the said fluid conduit, one terminal of said tubular-conductor coil communicating with the fluid conduit and the other terminal communicating with a space beyond the nozzle on the side thereof away from said coil.

18. An apparatus for progressively heat treating a workpiece by electromagnetic induction, an inducing coil, a support for said coil, means for effecting relative longitudinal movement between the workpiece to be heat-treated and said support for progressively heating the work, the trailing side of said support being contoured at its periphery to form one wall of a nozzle for an annular stream of quenching fluid and means having a peripheral portion complementary to said wall to form the opposite wall of said nozzle, at least one of said walls having a chamber therein in communication with said nozzle to supply quenching fluid thereto.

19. An apparatus for progressively heat-treating a workpiece by electromagnetic induction, an inducing coil, a support for said coil, means for effecting relative longitudinal movement between the workpiece to be heat treated and said support for progressively heating the work, the trailing side of said support being contoured at its periphery to form one wall of a nozzle for an annular stream of quenching fluid and means having a peripheral portion complementary to said wall to form the opposite wall of said nozzle, said last mentioned means having a second peripheral portion contoured to form one wall of a second nozzle, said apparatus including a third means having a peripheral portion complementary to said last mentioned wall to form the opposite wall of said second nozzle.

20. An induction heat-treating head for progressively heat-treating an inner portion of the wall of a cylindrical chamber in a body hardenable by heat treatment comprising an inducing coil, a core of magnetic material for said coil and having a portion extending radially outwardly across the trailing end of said coil to within close proximity to the wall to be heat treated, means for supporting said core having a narrow circumferential flange portion engaging said core portion and means axially spaced from and in association with the trailing side of said flange to discharge quenching fluid substantially directly from the trailing side of said flange outwardly toward the wall of the chamber and in a direction axially away from said flange, the space between said coil and the wall portion being heated being in open communication with the space axially beyond said axially spaced means.

21. Induction heat-treating apparatus for progressively heat treating a surface portion of an elongated object, comprising an induction heating element having a magnetic pole piece arranged to be presented in close proximity to a portion of the surface to be treated, means for effecting relative progressive movement between said heating element and the object in the direction of elongation of the object, and a quenching nozzle carried by said head contiguous the trailing edge of the pole piece for directing quenching fluid toward the surface heated by said heating element and in a direction axially away from said trailing edge the space between said heating element and the adjacent surface of the object being heated being in open communication with the space axially beyond the trailing end of said nozzle.

22. An induction heat-treating head, comprising an annular induction heating element, means disposed within said element for supporting said element, said means having a quenching fluid passageway therein, and means secured to said supporting means having an annular quenching fluid discharge passage located adjacent one end of said heating element in axially spaced relation, said last-mentioned means having passage means therein for conducting quenching fluid from said passageway to said discharge passage.

23. In an induction heat-treating apparatus having a tool shaft and an induction heating coil carried thereby, means for reciprocating said tool shaft comprising a fixed annular cylinder surrounding shaft in circumferentially spaced relation, the ends of said cylinder being in fluid-sealed relatively slidable engagement with said shaft, a piston member within said cylinder and rigidly secured to said shaft, an inlet and outlet conduit for said cylinder for the admission and release of working fluid to and from the space in said cylinder between said piston and one end of said cylinder, means operable upon a predetermined position of said piston near said end of said cylinder for closing the communication between the interior of said cylinder and said conduit, and a by-pass passage means permanently connecting said space with said conduit.

24. In an induction heat-treating head, an induction heating element for inducing magnetic heating currents, means adjacent said head in axially spaced relation with respect to one end of said heating element for discharging quenching fluid, and a core of magnetic material for said heating element, said core having an extension extending between said quenching fluid discharging means and said end of said heating element for directing flux between said means and heating element and for shielding said means from the magnetic heating effect of said heating element.

25. An apparatus for progressively hardening the surface of a work piece comprising an inducing head, a quench head adjacent the inducing head at least during the quenching operation, means for effecting relative movement between the work and said heads, means for rotating said quench head, means for supplying quenching fluid to said quench head during its rotation, said last-mentioned means including a rotatable pipe having an opening through the wall thereof and having its interior in communication with said quench head, a stationary enclosure surrounding the portion of said pipe containing said opening, and a quenching fluid supply passage connected to said enclosure for supplying quenching fluid thereto.

26. An apparatus for progressively hardening the surface of a work piece comprising an electromagnetic inducing head, a quench head adjacent the inducing head at least during the quenching operation, means for effecting relative movement between the work and said heads, means for rotating said quench head, means for supplying quenching fluid to said quench head during its rotation, said last-mentioned means including a rotatable pipe having an opening through the wall thereof and having its interior in communication with said quench head, a stationary enclosure surrounding the portion of said pipe containing said opening, a quenching fluid supply passage connected to said enclosure, and means for imparting reciprocation to said pipe and quench head during its rotation.

27. In apparatus for heat treating a cylindrical work piece by electromagnetic induction, a frame member, a transformer element having a secondary winding and an annular core element for said winding carried by said frame member, an induction heating coil, an arbor comprising concentric conductor elements, one of said conductor elements supporting said coil, and said conductor elements being electrically connected with said coil and being coaxially arranged with respect to said core element, means for moving said arbor relative to said core element, said conductor elements being insulated from each other, and means for maintaining electrical connections between said conductor elements and the terminals of said winding during movement of said arbor relative to said core element.

28. Apparatus for heat treating a cylindrical work piece by electromagnetic induction comprising a frame member, an electromagnetic inducing head mounted on said frame, a work holder support, means for movably mounting said support on said frame for movement axially of said head, a work holder, means for rotatably mounting said work holder on said support in coaxial alignment with said head, motor means for moving said support to move the work carried by said holder into and out of operative heating relation with respect to said head, and motor means for rotating said work holder independently of the movement of said support.

29. An induction heat treating head, comprising an induction heating element having a coolant passage therein provided with an inlet and an outlet, means disposed within said heating element in supporting relation and having a fluid passageway therein, and a quenching device secured to said means adjacent one end of said heating element and having a discharge nozzle opening, said coolant passage being in communication with both said inlet and said nozzle opening for conducting fluid thereto, said means having a chamber for receiving fluid from said heating element and a passage for the flow of fluid therefrom.

HOWARD E. SOMES.